United States Patent [19]

Hayashi

[11] 3,963,447

[45] June 15, 1976

[54] CATALYTIC REACTOR FOR EXHAUST GASES

[75] Inventor: Yoshimasa Hayashi, Yokohama, Japan

[73] Assignee: Nissan Motor Co., Ltd., Japan

[22] Filed: Feb. 22, 1974

[21] Appl. No.: 444,792

Related U.S. Application Data

[63] Continuation-in-part of Ser. No. 219,402, Jan. 20, 1972, abandoned.

[30] Foreign Application Priority Data

July 20, 1971    Japan................................ 46-64081

[52] U.S. Cl............................... 23/288 FA; 60/288
[51] Int. Cl.² .......................... F01N 3/15; B01J 8/02
[58] Field of Search .......... 23/288 FA; 60/286, 287; 55/DIG. 30

[56] References Cited
UNITED STATES PATENTS

| | | | |
|---|---|---|---|
| 2,991,160 | 7/1961 | Claussen | 23/288 FA |
| 3,097,074 | 7/1963 | Johnson | 23/288 FA |
| 3,176,461 | 4/1965 | Calvert | 60/288 |
| 3,201,207 | 8/1965 | Lentz | 23/288 FA |
| 3,220,805 | 11/1965 | Fowler et al. | 23/288 FA UX |
| 3,273,971 | 9/1966 | Baddorf et al. | 23/288 FA |
| 3,440,817 | 4/1969 | Saufferer | 23/288 FA X |
| 3,656,915 | 4/1972 | Tourtellotte | 23/288 F UX |
| 3,829,294 | 8/1974 | Smith | 23/288 FA |

Primary Examiner—Barry S. Richman
Attorney, Agent, or Firm—Robert E. Burns; Emmanuel J. Lobato; Bruce L. Adams

[57] ABSTRACT

A catalytic reactor for the exhaust gases of a motor vehicle comprising a catalyzer bed through which a pipe extends having one end connected to a secondary-air source. The other end of the pipe connected to a chamber wherein a simple and economical temperature detector, such as bimetal, is installed. When the temperature of the catalyzer bed exceeds a predetermined value, as measured by the temperature detector, a valve is electrically activated by an electrical circuit containing said detector, whereby exhaust gas bypasses said catalyzer bed.

5 Claims, 4 Drawing Figures

CATALYTIC REACTOR FOR EXHAUST GASES

This invention is a continuation-in-part of application of Ser. No. 219,402 filed on Jan. 20, 1972 and now abandoned.

This invention relates to a catalytic reactor system for a motor vehicle and more particularly to a temperature detector for a catalytic reactor utilizing secondary-air.

A catalytic reactor system for aiding toxic contents in the exhaust gases to react with one another to change to harmless products generally has a catalyzer bed carrying thereon a suitable catalyzer material. The catalyzer bed is installed at an intermediate portion of the exhaust pipe so as to pass therethrough the exhaust gases, whereby the toxic contents of the exhaust gases reacts with one another by the aid of the catalytic material. The catalyzer bed is, however, heated by the exhaust gases up to such a high temperature as 700°C, and the catalyzer bed is liable to be damaged by such a high temperature. A temperature detector detecting the temperature of the catalyzer bed is therefore mounted on the catalyzer bed.

A problem is still encountered in that a complicated and expensive detector, for example thermocouple, should be employed for the detection of such high temperature.

It is therefore an object of this invention to provide an improved catalytic reactor system for the exhaust gases of a motor vehicle.

Another object is to provide a catalytic reactor system having a simple and economical temperature detector.

Another object is to provide a catalytic reactor which is free from overheating.

Other objects, advantages and novel features of this invention will become apparent from the following detailed description of the invention when considered in conjunction with the accompanying drawings.

Figure 1:
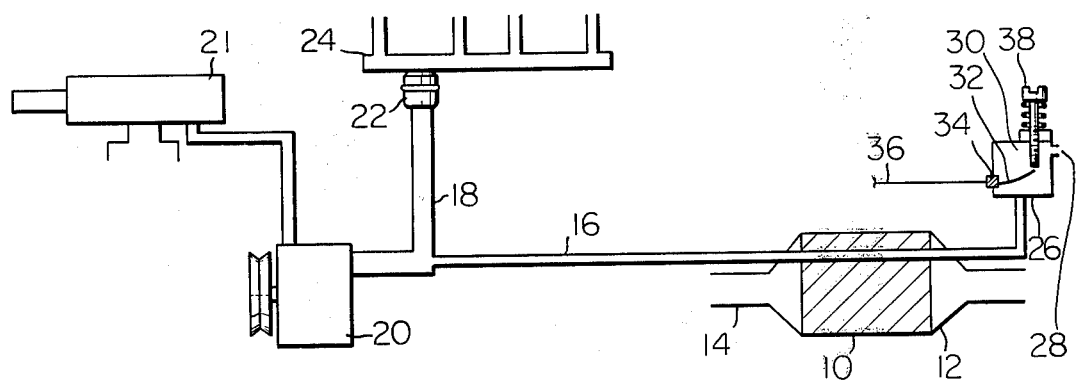
FIG. 1 is a sectional view of a temperature detector according to this invention.

Referring now to FIG. 1, a catalytic reactor system according to this invention comprises a catalyzer bed 10 installed at an enlarged portion 12 of the exhaust pipe 14 of a motor vehicle. Being thus constructed, the exhaust gases pass through the catalyzer bed and react with one another by the aid of a catalyzer material carried by the catalyzer bed. Through the catalyzer bed 10 and the enlarged portion 12 extends a small pipe 16 having one end connected to a large pipe 18.

The large pipe 18 is filled with pressurized air usable for the secondary air produced by a secondary-air source 20 connected to one end of the pipe 18. The secondary-air source 20 may be a well known type of pneumatic pump connected to an air cleaner 21 of an engine carburetor. The air cleaner 21 is of a type having a known automatic air temperature regulating system so that secondary-air source 20 supplies air having a constant temperature to an exhaust manifold through the pipe 18. The other end of pipe 18 is connected to a check valve 22 which passes therethrough the air in the pipe 18 to a drain pipe 24. The other end of the small pipe 16 is in communication with one port of a chamber 26. The pressurized air in the pipe 18 is therefore delivered through the pipe 16 to the chamber 26 and discharged through an opening 28 of the chamber 26. A temperature sensing means such as a bimetal switch 30 is disposed within the chamber 26. The bimetal switch 30 consists of a bimetal strip 32 which is fastened to the wall of the chamber through an insulator 34 and is connected to a lead wire 36, and an adjusting member 38. The position of one end of the adjusting member 38 is adjusted so as to contact the end of the bimetal strip 32 when the temperature of the air in the chamber 26 exceeds a preselected value. The lead wire 36 and the adjusting member 38 are connected to an electrical circuit (not shown) for detecting the closure of the bimetal switch 30.

Figure 2:
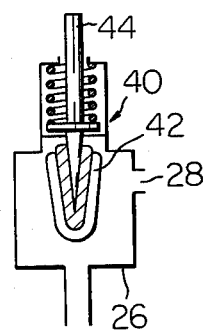
FIG. 2 is a sectional view of a thermostat for use with the detector of FIG. 1.

FIG. 2 shows a thermostat 40 replacing the bimetal switch 30 in FIG. 1. The thermostat comprises a detecting portion 42 and moving rod 44 which moves up and down in accordance with the temperature of the air in the chamber 26.

Figure 3:
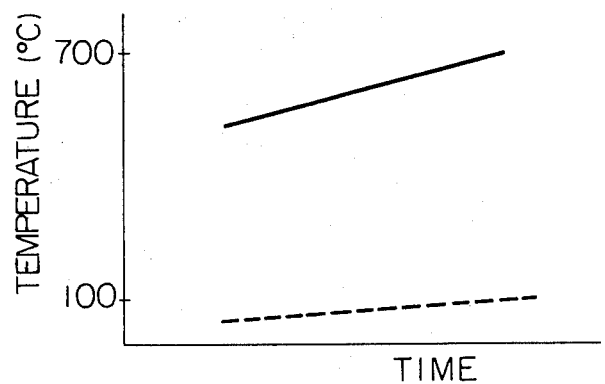
FIG. 3 is a graph showing variations of temperatures at the catalyzer bed and the secondary-air passed through the catalyzer bed.

Since the pressurized air passes through the small pipe 16 which extends through the catalyzer bed 10, the temperature of the air in the chamber 26 is proportional to that of the catalyzer bed as shown by solid and broken lines, respectively, in the graph of FIG. 3. It is therefore possible to determine the temperature of the catalyzer bed by detecting that of the air in the chamber 26 when the relationship between the temperatures of catalyzer bed and the air in the chamber 26 is known. In this instance, it is to be noted that the temperature of the air in the chamber 26 is generally lower than 100°C, although the temperature of the catalyzer bed is so high as to be near to 700°C. The bimetal switch 30 or thermostat is therefore sufficient although the temperature of the catalyzer bed is as high as 700°C.

Figure 4:
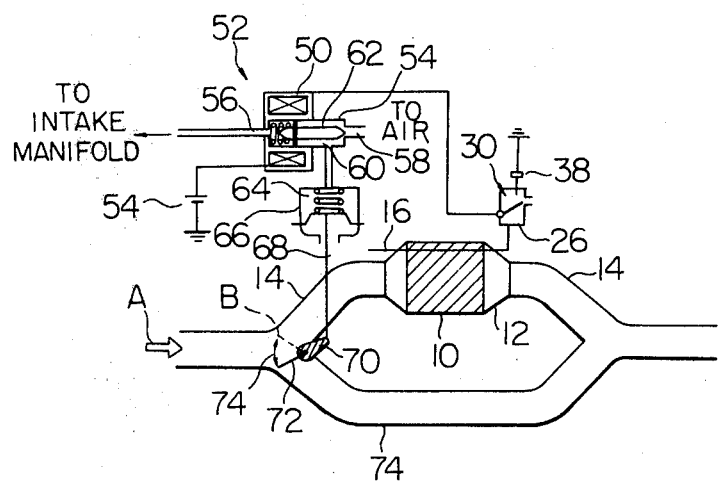
FIG. 4 is a schematical view schematic representation of a reactor using the temperature detector of FIG. 1.

FIG. 4 shows the temperature detection of FIG. 1 which is combined with means for preventing the exhaust gases from passing through the catalyzer bed when the temperature of the catalyzer bed rises so high as to be damaged. The adjusting member 38 is grounded through a wire and the bimetal strip 32 is connected to one terminal of a solenoid coil 50 of a electrically energized valve 52. The other terminal of the coil 50 is connected to a positive terminal of a power source 54, a negative terminal of which is grounded. The solenoid coil 50 surrounds a housing having therein a bore 54 which has three ports 56, 58 and 60. A valve element or plunger 62 is accommodated in the bore 54. The valve element 62 is urged to an utmost position by a spring acting against the intake manifold vacuum applied through the port 56 thereby closing the port 58 which is in communication with the air. In this condition, the port 56 is in communication with the port 60 which is connected to a chamber 64 of a diaphragm 66. When the solenoid coil 50 is energized, the valve element 62 is moved against the spring force of the spring thereby closing the port 56 and establishing communication between the ports 58 and 60.

The diaphragm 66 has linkage comprising a rod 68 which moves in accordance with the pressure in the chamber 64. A top end of the rod 68 is connected to an arm 70 of valve element 72 of a control valve 74. The valve 72 is adapted to selectively close the exhaust pipe 14 wherein the catalyzer bed 10 is accommodated and a by-pass pipe 74 bypassing the catalyzer bed 10.

As long as the temperature of the catalyzer bed 10 is so low that the bimetal switch 26 is open, the solenoid valve is non-energized so that the chamber 64 of the diaphragm 66 is in communication through the ports 60 and 56 with the intake manifold whereby the valve element 72 of the control valve 74 closes the by-pass pipe. Thus, in this condition, the exhaust gases admitted to the control valve 74 as shown by an arrow A is advanced through the exhaust pipe 14 to the catalyzer bed 10. The exhaust gases react with one another in the catalyzer bed 10 and thereafter are discharged through the exhaust pipe 14. When the temperature of the catalyzer bed 10 rises so high that the bimetal switch 30 closes, the solenoid valve 50 is actuated to move the valve element 62 whereby the ports 58 and 60 are placed in communication with each other. The diaphragm 66 is then actuated to move the rod 68 so that the valve element 72 is moved to a position shown by a dotted line B, so that, the exhaust gases are prevented to pass through the exhaust pipe 14 and admitted to the by-pass pipe 74. When the temperature of the catalyzer bed 10 is lowered sufficiently, the bimetal switch 30 opens thereby to de-energize the electrically energized valve 52 and to restore the control valve 72. It is apparent from the above description that undesired overheating of the catalyzer bed is effectively prevented.

It will be understood that the invention is not to be limited to the exact construction shown and described and that various changes and modifications may be made without departing from the spirit and scope of the invention, as defined in the appended claims.

What is claimed is:

1. A catalytic reactor system for a vehicle, connected in use to an internal combustion engine, said catalytic reactor system comprising means defining an exhaust flow path for the exhaust gases of an internal combustion engine comprising a main flow path and a by-pass flow path, a catalyzer bed in said main flow path, selecting valve means for selecting between said main flow path and said by-pass flow path as the exhaust flow path for said exhaust gases, means defining a secondary flow path through said catalyzer bed and separate from said exhaust flow path for a flow of air to effect heating of the air flow through said secondary flow path by said catalyzer bed to render the temperature of said air flow proportional to the temperature of said catalyzer bed but substantially less than said temperature of said catalyzer bed, temperature sensing means to sense the temperature of said flow of air in said secondary flow path, control means responsive to said temperature sensing means for actuating said selecting valve means to select said main flow path when said temperature sensed is below a predetermined value and to select said by-pass flow path when said temperature sensed is above a predetermined value.

2. A catalytic reactor system according to claim 1, wherein said secondary flow path comprises a conduit passing through said catalyzer bed.

3. A catalytic reactor system according to claim 1, wherein said temperature sensing means comprises a bimetallic switch mounted within said secondary flow path.

4. A catalytic reactor system according to claim 1, wherein said temperature sensing means comprises a thermostat mounted within said secondary flow path.

5. A catalytic reactor of a motor vehicle having an exhaust system provided with a secondary air source, said catalytic reactor comprising a catalyzer bed for carrying thereon a catalyzer material, said bed being mounted on an exhaust pipe of said exhaust system so as to pass therethrough exhaust gases, a secondary air flow pipe separate from said exhaust pipe and connected to said secondary air source and extending through said catalyzer bed and permitting pressurized air pressurized by said secondary air source to pass through said pipe to a temperature detector, said detector completing an electric circuit when a temperature of said pressurized air having passed through said pipe exceeds a predetermined temperature, an actuating means electrically connected to said detector by said circuit, said actuating means being actuated when energized by an electric power source when said circuit is completed, and a valve means for controlling the flow of exhaust gases into said catalyzer bed and connected to said actuating means, said valve means being closed to prevent flow of said exhaust gases into said catalyzer bed when said actuating means is actuated, whereby said exhaust gases flow through a by-pass means communicating with said exhaust system.

* * * * *